(12) United States Patent
Bubb et al.

(10) Patent No.: US 8,738,810 B2
(45) Date of Patent: *May 27, 2014

(54) FACILITATING PROCESSING OF OUT-OF-ORDER DATA TRANSFERS

(75) Inventors: Clinton E. Bubb, Pleasant Valley, NY (US); Daniel F. Casper, Poughkeepsie, NY (US); John R. Flanagan, Poughkeepsie, NY (US); Raymond M. Higgs, Poughkeepsie, NY (US); George P. Kuch, Poughkeepsie, NY (US); Jeffrey M. Turner, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 147 days.

This patent is subject to a terminal disclaimer.

(21) Appl. No.: 13/455,336

(22) Filed: Apr. 25, 2012

(65) Prior Publication Data

US 2012/0311218 A1 Dec. 6, 2012

Related U.S. Application Data

(63) Continuation of application No. 13/150,606, filed on Jun. 1, 2011.

(51) Int. Cl.
*G06F 3/00* (2006.01)
(52) U.S. Cl.
USPC .................................................. 710/3; 710/26
(58) Field of Classification Search
USPC ........ 710/26, 29, 30, 34, 43, 52, 56, 308, 310
See application file for complete search history.

(56) References Cited

U.S. PATENT DOCUMENTS

| 5,799,165 | A | 8/1998 | Favor et al. |
|---|---|---|---|
| 6,078,736 | A | 6/2000 | Guccione |
| 6,185,620 | B1 * | 2/2001 | Weber et al. .................. 709/230 |
| 6,292,910 | B1 | 9/2001 | Cummins |
| 6,314,477 | B1 | 11/2001 | Cowger et al. |
| 6,557,101 | B1 | 4/2003 | MacDonald et al. |
| 6,594,722 | B1 | 7/2003 | Willke, II et al. |
| 6,867,614 | B1 | 3/2005 | LeGraverand et al. |
| 6,937,063 | B1 | 8/2005 | Sun et al. |

(Continued)

FOREIGN PATENT DOCUMENTS

EP 0947049 A1 10/1999

OTHER PUBLICATIONS

Chencinski, E.W. et al., "IBM System z10 I/O Subsystem," IBM J. Res. & Dev., vol. 53, No. 1, p. 6, Jan. 2009, pp. 6:1-6:13.

(Continued)

*Primary Examiner* — Khanh Dang
(74) *Attorney, Agent, or Firm* — Steven Chiu, Esq.; Blanche E. Schiller, Esq.; Heslin Rothenberg Farley & Mesiti P.C.

(57) ABSTRACT

Processing of out-of-order data transfers is facilitated in computing environments that enable data to be directly transferred between a host bus adapter (or other adapter) and a system without first staging the data in hardware disposed between the host bus adapter and the system. An address to be used in the data transfer is determined, in real-time, by efficiently locating an entry in an address data structure that includes the address to be used in the data transfer.

20 Claims, 6 Drawing Sheets

(56) References Cited

U.S. PATENT DOCUMENTS

| | | |
|---|---|---|
| 7,096,398 B1 | 8/2006 | Mukherjee |
| 7,210,000 B2 | 4/2007 | Creta et al. |
| 7,231,560 B2 | 6/2007 | Lai et al. |
| 7,349,399 B1 * | 3/2008 | Chen et al. .............. 370/394 |
| 7,412,555 B2 | 8/2008 | Wang |
| 7,412,589 B2 | 8/2008 | Feiste |
| 7,437,643 B2 | 10/2008 | Khanna et al. |
| 7,443,869 B2 | 10/2008 | Solomon et al. |
| 7,463,056 B1 | 12/2008 | Anderson et al. |
| 7,482,835 B1 | 1/2009 | Sun et al. |
| 7,519,865 B1 | 4/2009 | Maly et al. |
| 7,616,508 B1 | 11/2009 | Landry et al. |
| 7,676,611 B2 | 3/2010 | Hui et al. |
| 7,685,380 B1 | 3/2010 | Khu |
| 7,747,809 B2 | 6/2010 | Hanscom |
| 7,782,760 B2 | 8/2010 | Froroth et al. |
| 7,836,352 B2 | 11/2010 | Sharma et al. |
| 7,853,774 B1 | 12/2010 | Wentzlaff |
| 7,882,296 B2 | 2/2011 | Reed |
| 7,885,122 B2 | 2/2011 | Landry et al. |
| 2005/0025152 A1 * | 2/2005 | Georgiou et al. .......... 370/394 |
| 2005/0286526 A1 * | 12/2005 | Sood et al. ............... 370/394 |
| 2006/0075165 A1 * | 4/2006 | Hui et al. ................. 710/58 |
| 2007/0233821 A1 | 10/2007 | Sullivan et al. |
| 2008/0052728 A1 * | 2/2008 | Steinmetz et al. .......... 719/313 |
| 2008/0126608 A1 * | 5/2008 | Chang et al. .............. 710/30 |
| 2008/0163005 A1 | 7/2008 | Sonksen et al. |
| 2009/0182988 A1 * | 7/2009 | Greiner et al. ............. 712/216 |
| 2009/0292960 A1 | 11/2009 | Haraden et al. |
| 2010/0083040 A1 | 4/2010 | Voigt et al. |
| 2010/0251055 A1 | 9/2010 | Murakami et al. |
| 2010/0325495 A1 | 12/2010 | Talla et al. |
| 2011/0029706 A1 | 2/2011 | Bekooij et al. |
| 2011/0320759 A1 * | 12/2011 | Craddock et al. ............. 711/206 |

OTHER PUBLICATIONS

Blank, Annika et al., "Advanced Power Virtualization on IBM System p5," IBM.com/redbooks, Oct. 2005, pp. 1-452.

Mitchell, Jim et al., "IBM Power5 Process-based Servers: A Highly Available Design for Business-Critical Applications," Oct. 2005, pp. 1-44.

Patel, Bindesh et al., "Transaction-based Debug of PCI Express Embedded SoC Platforms," CompactPCI and AdvancedTCA Systems, Dec. 2004, pp. 1-4.

Paz-Vincente, R. et al., "Time-Recovering PCI-AER Interface for Bio-Inspired Spiking Systems," Proceedings of the SPIE—The International Society for Optical Engineering, vol. 5839, No. 1, pp. 111-118, May 2005 (Abstract Only).

"z/Architecture—Principles of Operation," SA22-7932-08, Ninth Edition, Aug. 2010, pp. 1-1496.

Response to Office Action for U.S. Appl. No. 13/150,606 dated Apr. 18, 2013, pp. 1-17.

International Search Report and Written Opinion for PCT/IB2012/052538, dated Oct. 4, 2012, pp. 1-7.

Office Action for U.S. Appl. No. 13/150,606 dated Jan. 18, 2013, pp. 1-12.

* cited by examiner

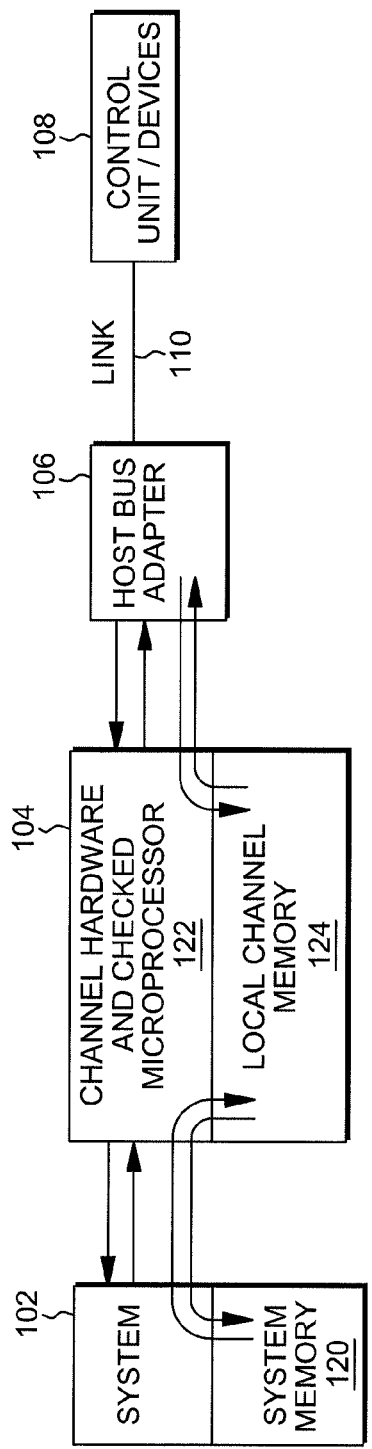
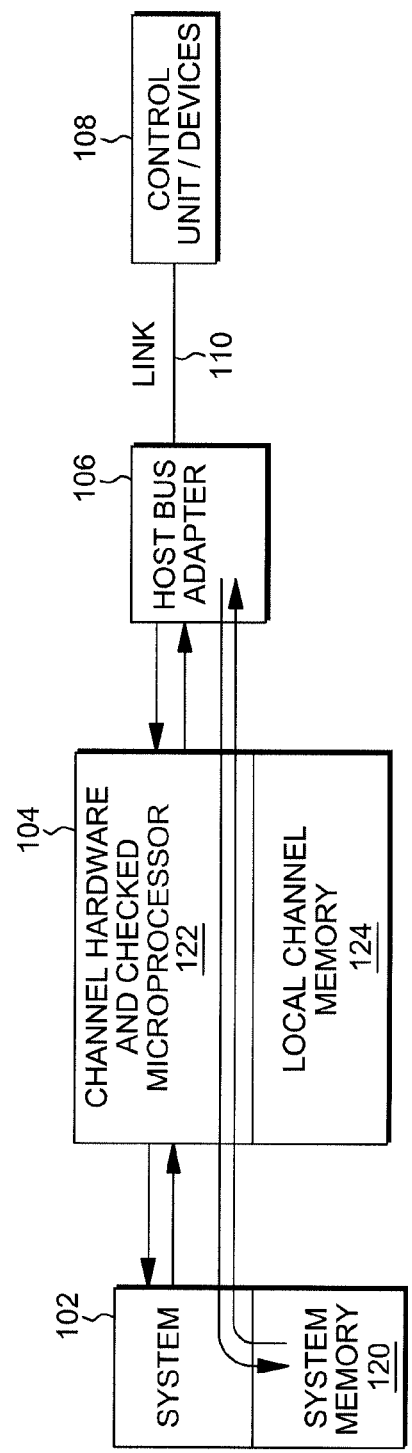

| ADDRESS | COUNT | SGE INDEX | RELATIVE OFFSET | STARTING BLOCK |
|---|---|---|---|---|
| 0x00001234 56787000 | 0x1000 | 0 | 0x000000 | 0 |
| 0x00001234 5678A000 | 0x1000 | 1 | 0x001000 | 8 |
| 0x00000432 76543000 | 0x0200 | 2 | 0x002000 | 16 |
| 0x00001234 56783000 | 0x1000 | 3 | 0x002200 | 17 |
| 0x00001234 56789000 | 0x1000 | 4 | 0x003200 | 25 |
| 0x00000432 76543200 | 0x0200 | 5 | 0x004200 | 33 |
| 0x00001234 5678B000 | 0x1000 | 6 | 0x004400 | 34 |
| 0x00001234 5678E000 | 0x1000 | 7 | 0x005400 | 42 |
| 0x00000432 76543400 | 0x0200 | 8 | 0x006400 | 50 |

ADDRESS CONTROL WORD
- SG LIST POINTER ~410
- 4K VERIFIED OFFSET ~420
- NEXT EXPECTED OFFSET ~430
- WORKING SGE COUNT ~440
- WORKING SGE INDEX ~450

FACILITATING PROCESSING OF OUT-OF-ORDER DATA TRANSFERS

This application is a continuation of U.S. Ser. No. 13/150, 606, entitled "FACILITATING PROCESSING OF OUT-OF-ORDER DATA TRANSFERS," filed Jun. 1, 2011, which is hereby incorporated herein by reference in its entirety.

BACKGROUND

One or more aspects of the invention relate, in general, to the transfer of data to and from memory of a computing environment, and in particular, to the processing of out-of-order data transfers within the computing environment.

In some computing environments, such as those that include System z® servers offered by International Business Machines Corporation, data is transferred from memory of a computing system to input/output devices, and from the input/output devices to memory using one or more host bus adapters (HBAs). The host bus adapters are attached to the system through hardware which isolates the host bus adapters from the system. This hardware provides isolation of the unchecked host bus adapter from the system, so as to maintain reliability, availability and serviceability (RAS) for the system.

With this type of configuration, all data flowing to/from the system is temporarily stored in the hardware, and then, moved from the hardware to its intended destination. Thus, a store and forward delay is incurred for each data transfer.

BRIEF SUMMARY

The shortcomings of the prior art are overcome and advantages are provided through the provision of a method of facilitating transfers of data in a computing environment. The method includes, for instance, determining, by channel hardware, whether data to be transferred is out-of-order; based on the data being out-of-order, comparing a received offset of the data with a first offset; based on the received offset being one value with respect to the first offset, scanning an address data structure starting at the first offset or a second offset to locate an entry in the address data structure having the received offset and obtaining from the entry an address to be used to transfer the data; and based on the received offset being another value with respect to the first offset, determining at least one of an index and a count to be used to locate an entry in the address data structure, and obtaining from the entry the address to be used to transfer the data.

Computer program products and systems relating to one or more aspects of the present invention are described and may be claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

FIG. 2A depicts one embodiment of transferring data within the computing environment, in which the data is initially staged in the memory of the hardware of the computing environment;

FIG. 2B depicts one embodiment of transferring data without staging the data in the memory of the hardware, in accordance with an aspect of the present invention;

DETAILED DESCRIPTION

In accordance with an aspect of the present invention, a capability is provided for facilitating processing of out-of-order data transfers. In one particular example, the processing of out-of-order data transfers is facilitated in computing environments that enable data to be directly transferred between a host bus adapter (or other adapter) and a system without first staging the data in hardware disposed between the host bus adapter and the system.

To perform the data transfer, an address is to be determined indicating a location in memory at which the data is to be fetched/stored. Thus, in accordance with an aspect of the present invention, a technique is provided to efficiently locate an entry in an address data structure that includes the address to be used in the data transfer. The technique provides efficient processing even if the data transfer is out-of-order. As one example, the determination of the address is based on an offset provided with the data. This offset is used to locate the entry and obtain the memory address. That is, a technique is provided for accelerating translation of a received offset to a system address usable in directly accessing system memory.

Figure 1:
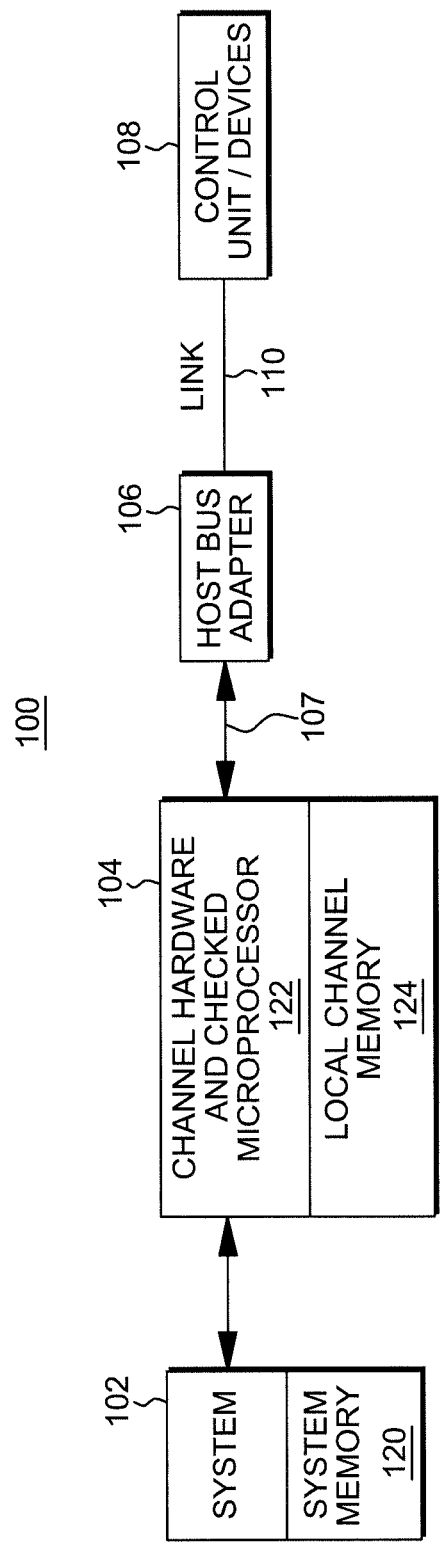
FIG. 1 depicts one embodiment of a computing environment to incorporate and/or use one or more aspects of the present invention.

One embodiment of a computing environment to incorporate and/or use one or more aspects of the present invention is described with reference to FIG. 1. As shown, in one example, a system 102 is coupled to hardware 104, which is further coupled to one or more adapters (e.g., host bus adapters) 106 via one or more links 107 (e.g., PCIe links). The host bus adapters are further coupled to one or more control units/devices 108 via one or more links 110 (e.g., Fibre Channel links) System 102 may be, for instance, a System z® server offered by International Business Machines Corporation (IBM®); a zEnterprise 196 (z196) server offered by International Business Machines Corporation; or other systems offered by International Business Machines Corporations or other companies. It includes, for instance, one or more central processing units executing one or more operating systems, such as the zOS® operating system offered by International Business Machines Corporation, as well as system memory 120 (a.k.a., main memory).

Hardware 104 includes, for instance, channel hardware and a checked microprocessor 122, as well as local channel memory 124. (Checked indicates it is compatible with the system with respect to RAS; in contrast, unchecked would indicate that it is not compatible with respect to RAS.) The hardware is used to transfer data between the host bus adapter and system memory. For instance, when data is to be read from system memory or written to system memory, the operating system creates a command block that includes the request, a starting block address, a count of the number of bytes to be transferred and an indication of the direction (e.g., read/write), and forwards that command block to the hardware. The hardware then passes the information to the host bus adapter. The host bus adapter and hardware then perform the data transfer.

For example, in one prior embodiment, as shown in FIG. 2A, the hardware was used, on highly reliable computing systems, such as System z®, to isolate the host bus adapter from the system, such that the hardware appeared as the host to the host bus adapter. Thus, to perform a data transfer, the data was staged in the local channel memory and then moved from local channel memory to a selected destination. For instance, for an outbound transfer of data from system 102 to the input/output devices, checked microprocessor 122 would receive the command block, obtain the requested data from system memory 120 and write it into local channel memory 124. Further, it would communicate the command to the host bus adapter. Host bus adapter 106 then fetched the data from local channel memory 124 and forwarded it to devices 108. Similarly, for an inbound transfer of data from devices 108, host bus adapter 106 stored the data in local channel memory 124, and then checked microprocessor 122 accessed the data in the local channel memory and forwarded it to system memory 120. This technique is referred to herein as the store and forward model.

However, in accordance with an aspect of the present invention, the staging of the data in the hardware is bypassed in the transfer of data; instead, data is transferred directly, as depicted in FIG. 2B. As shown in FIG. 2B, host bus adapter 106 transfers data directly to system memory 120 through channel hardware 104 without requiring the data to first be stored in local channel memory 124. Similarly, data is transferred directly from system memory 120 to host bus adapter 106 again without storing the data in the local channel memory. This technique is referred to herein as the direct transfer model.

In the direct transfer model, the command block is still forwarded to the hardware (e.g., the channel hardware and/or checked microprocessor) and from the hardware to the host bus adapter, but the data is not staged in the local channel memory. The data is transferred in one example in-order. However, certain upper layer protocols, such as the Small Computer System Interface (SCSI), provide a mode of operation in which a device can transfer a portion of the data, which is most expedient for its design on the link, even if that data is out of sequence. For example, for a read operation, the device might send the blocks of data which it has in its cache first, overlapped with the staging of the rest of the data from the media. As another example, error recovery mechanisms built into the fibre channel link protocol may cause a portion of either read or write data to be re-transmitted, also resulting in an out-of-order transfer. Thus, in accordance with an aspect of the present invention, the direct transfer of both read and write data between the host bus adapter and system memory supports out-of-order data transfers.

To transfer data, either in-order or out-of-order, one or more frames are used, each including a particular amount of data. The frame has a header that includes descriptive information about the frame to be transferred. For instance, in one embodiment in which a fibre channel link protocol is used in the transfer of data, the header includes a relative offset. The relative offset indicates the offset of the first byte of payload data contained in the frame relative to the beginning of a contiguous block of data to be transferred (referred to herein as a logical block). The first byte of data specified in a command block is at relative offset 0. Normal "in-order" transfers have a continuously increasing relative offset, i.e., the first frame sent is with offset 0, and subsequent frames with relative offsets 2K, 4K, etc. (assuming each frame includes 2K bytes) until the count specified in the command block is satisfied. However, when a device elects to transfer data out-of-order (e.g., for performance reasons), relative offsets can be received on the link in random order.

For example, consider a SCSI read request to transfer 51 blocks of data (where each block equals 512 bytes) starting at logical block 3000. Further, assume that blocks 3018-3034 are in the device's cache. The device may elect to transfer the blocks in the cache first, overlapped with the staging of the rest of the data in from the media. Therefore, it may transfer blocks 3018-3034, 3000-3017, and 3035-3050 in that order, as an example. This would translate into a sequence of frames with relative offsets in the following three ranges: 0x2400-0x4400; 0x0-0x2200; and 0x4600-0x6400.

The relative offsets are used in determining addresses at which to fetch or store the frames. For example, in the store and forward model described with reference to FIG. 2A, for a data store example, the host bus adapter receives the data over the link, possibly out-of-order, and loads the data into the designated buffers in local channel memory per the relative offset before it notifies the channel microprocessor of the completion of the data transfer. Then, the channel microprocessor determines the addresses at which the data is to be stored by translating the buffer address into a series of real addresses in memory. The channel microprocessor then stores the data at the determined addresses in-order in system memory, without any knowledge that the data actually arrived out-of-order on the link.

However, for the direct transfer model, the relative offsets received at the host bus adapter are passed to the channel hardware to be translated by the channel hardware into corresponding addresses in system memory in real-time, as the frames are arriving. This is a complex task in those systems where memory is not a flat, contiguous address space, but instead, employ virtual addressing. Due to virtual memory requirements, the storage assigned to I/O operations is typically provided as a list of non-contiguous 4K page buffers. Additionally, in this example, a scatter and gather capability within the virtual space is provided. Thus, the system memory area for the I/O operation is specified as a scatter gather (SG) list, where each entry (SGE) in the list includes an address and count pair. This is to allow, for instance, metadata to be stored contiguously with the real data on the media, but separately in system memory (e.g., the data may be stored in application buffers, but the metadata may be stored in operating system space).

Figures 3, 4:
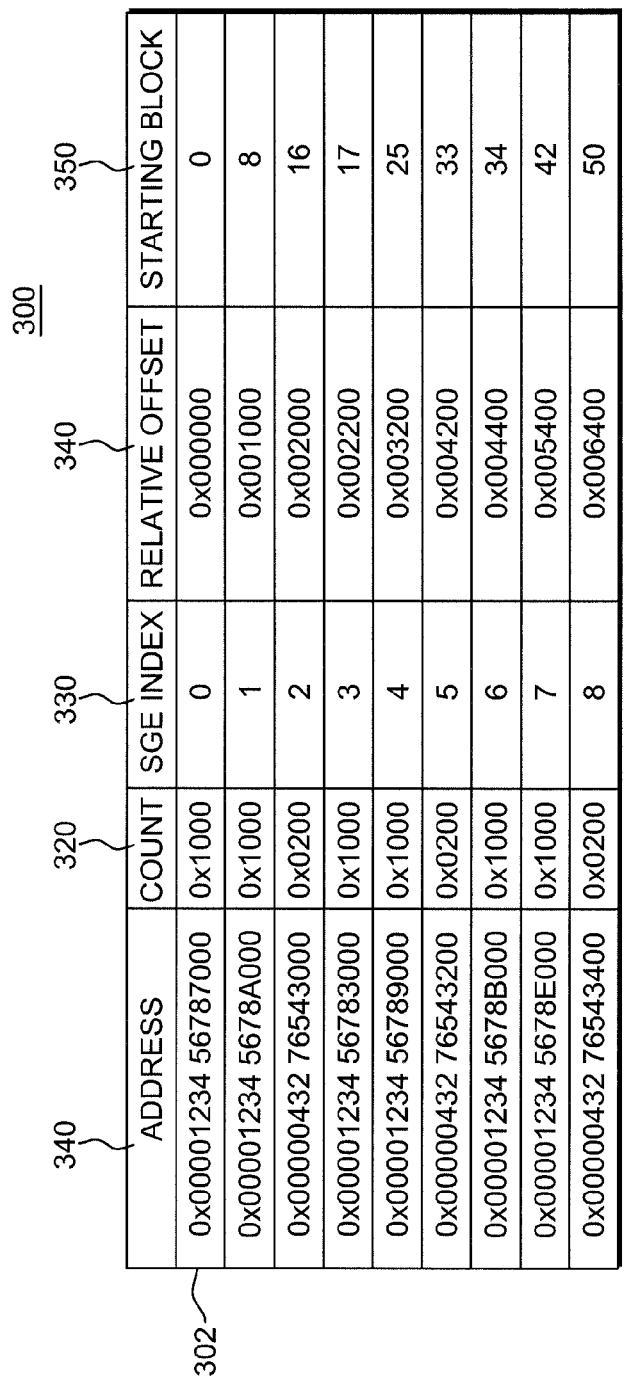
FIG. 3 depicts one example of an address data structure including an address list and other information used in accordance with an aspect of the present invention.
FIG. 4 depicts one example of various controls of an address control word used in accordance with an aspect of the present invention.

One example of a scatter gather list is described with reference to FIG. 3. Referring to FIG. 3, an address data structure (e.g., table) 300 is provided that includes a plurality of entries 302. Each entry includes an address 310, a count 320, an index 330, a relative offset 340 and a starting block 350. The address and count are referred to as the scatter gather list. The additional information is used to facilitate determining an address associated with an offset, as described below.

Continuing with the above example, if there is one block of metadata for every eight blocks of data, then an example scatter gather list for the 51 block transfer is shown in the first two columns of FIG. 3. The combination of random counts in the scatter gather list plus random relative offsets of the data previously required that the scatter gather list be scanned from the top for each received frame or data request in order to determine the system address which corresponds to a given relative offset.

Thus, in accordance with an aspect of the present invention, a capability is provided to facilitate determination of a system address such that the scatter gather list does not have to be scanned from the top for each frame or data request. The capability works with completely random combinations of scatter gather counts and relative offsets. This allows the acceleration of out-of-order data transfers.

In one example, effective optimizations are realized based on the following practical usage of the counts and offsets. For instance, for a given I/O operation, discontinuities in the relative offsets are rare. Therefore, in one example, the design is optimized for continuous relative offsets. Further, the most common use of the scatter gather capability is for specifying virtual memory page buffers. Therefore, in one example, the design is optimized for scatter gather counts of 4096. However, in other implementations, the optimizations may be different or ignored. Further details regarding the technique to facilitate look-up of a system address are described below.

In one example, various fields of a control block, referred to as an address control word (ACW), are used in the logic to locate a system address in a list, such as a scatter gather list. The ACW is built by the channel microprocessor responsive to receiving a transfer command from the operating system. There is one ACW for each I/O operation (e.g., controlling each transfer from beginning to end), in one example. Each control block is stored, for instance, in local channel memory 124.

Referring to FIG. 4, in one example, an address control word 400 includes, for instance, the following fields used in accordance with an aspect of the present invention (ACW 400 may include additional, different or less fields in other embodiments or for other uses):

Scatter Gather List Pointer 410: This field includes a memory address of the top of the scatter gather list. This list may either be in system memory or it may be in local channel memory.

4K Verified Offset 420: This field represents the first two bytes of an offset corresponding to the first scatter gather entry, which has not been verified as having a count of exactly 4096. (In other examples, the count may be other than 4096.) This value is initialized to zero on the first access to the address control word. Each scatter gather entry is processed sequentially, either through normal (in-order) operation, or through scanning, if out-of-order transfers occur on the link, as described below. For each scatter gather entry processed, this value is advanced by, for instance, 16, if the scatter gather entry had a count of exactly 4096. When a scatter gather entry with a count less than 4096 is encountered, the 4K verified offset value is frozen.

In one example, only two bytes of the three-byte offset are stored since, by definition, the low order byte is zero. (However, in other embodiments, more or less bytes are stored.) When an out-of-order offset is encountered, which is less than this value, the corresponding scatter gather index and count may be computed by a shift and mask, respectively.

Next Expected Offset 430: This value is set to zero on the initial access to the address control word. For each request (e.g., PCI request), this value is compared to the offset received from the host bus adapter. If they are equal, then the transfer was in-order with respect to the previous transfer, and the data can be fetched or stored using the working scatter gather entry index and count. If they are not equal, then the transfer occurred out-of-order, and defined rules are applied to determine the scatter gather index to use to transfer the data, as described in further detail below.

Working Scatter Gather Entry Count 440 and Working Scatter Gather Entry Index 450: On the completion of each host bus adapter request, the scatter gather index and count of the next sequential byte to be transferred are saved in these fields. If the current transfer exactly satisfied the count in the current scatter gather entry, then the scatter gather entry index is incremented to the next value and the scatter gather entry count is set to zero. If the relative offset in the next host bus adapter request matches the next expected offset in the address control word, these values are used to continue the data transfer for the new request. These values are set to zero on the initial access to the address control word.

Figure 5:
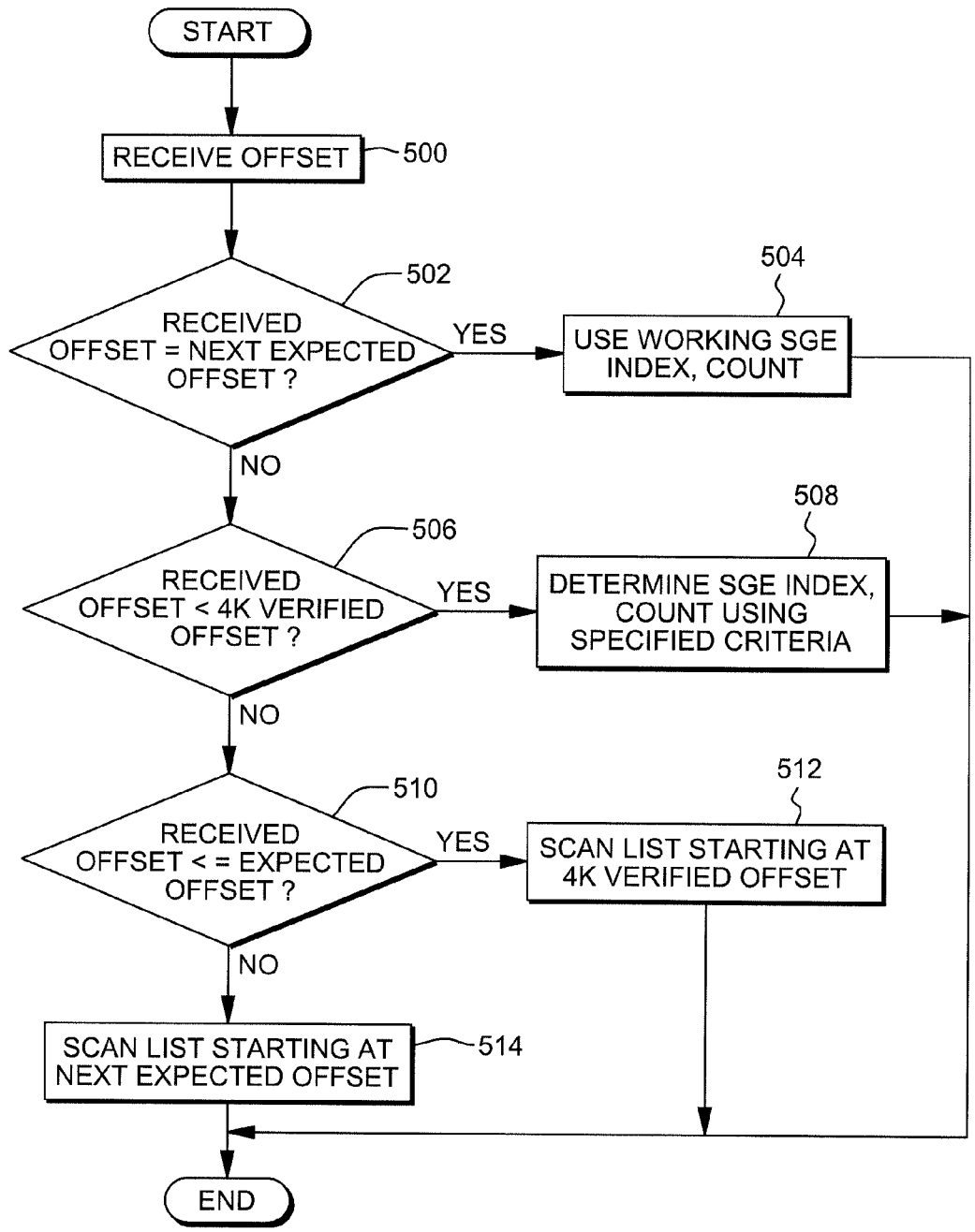
FIG. 5 depicts one embodiment of the logic used to scan the address data structure to locate an address to be used in a requested data transfer, in accordance with an aspect of the present invention.

As described above, predefined rules are employed by the channel hardware to locate an address for a data transfer. One example of these rules is described with reference to FIG. 5. Referring to FIG. 5, initially a request to transfer data is received with a specified relative offset (initially provided in the frame header), STEP 500. A determination is made as to whether this received offset is equal to the next expected offset specified in the address control word, INQUIRY 502. If the received offset is equal to the next expected offset, then the data transfer is in-order, and therefore, the working scatter gather entry index and count specified in the address control word are used to locate an entry in the address data structure and obtain from the entry the address at which the data is to be stored or fetched, STEP 504.

However, if the received offset is not equal to the next expected offset, INQUIRY 502, then the data transfer is an out-of-order data transfer. Therefore, in this example, a determination is made as to whether the received offset is less than the 4K verified offset specified in the address control word, INQUIRY 506. If the received offset is less than the 4K verified offset, then the scatter gather entry index and count are determined, STEP 508. In one example, to determine the scatter gather entry index, the received offset is right shifted by a defined value, e.g., 12. Further, the scatter gather entry count is equal to a selected number (e.g., 12) of the low order bits of the received offset. The determined count and index are then used to locate an entry in the address data structure from which the address is obtained.

Returning to INQUIRY 506, if the received offset is greater than or equal to the 4K verified offset, then a further determination is made as to whether the received offset is less than or equal to the expected offset, INQUIRY 510. If the received offset is less than or equal to the expected offset, then the address data structure is scanned starting at the 4K verified offset until an entry containing the received offset is found. The address within that entry is obtained for the data transfer, STEP 512. Otherwise, the address data structure is scanned starting at the next expected offset until an entry containing the received offset is found, STEP 514. The address within that entry is obtained for the data transfer.

By using the rules above, the entire address data structure (or scatter gather list) does not need to be scanned from the top each time an out-of-order transfer is received. This enhances system performance and accelerates out-of-order data transfers.

Figure 6:
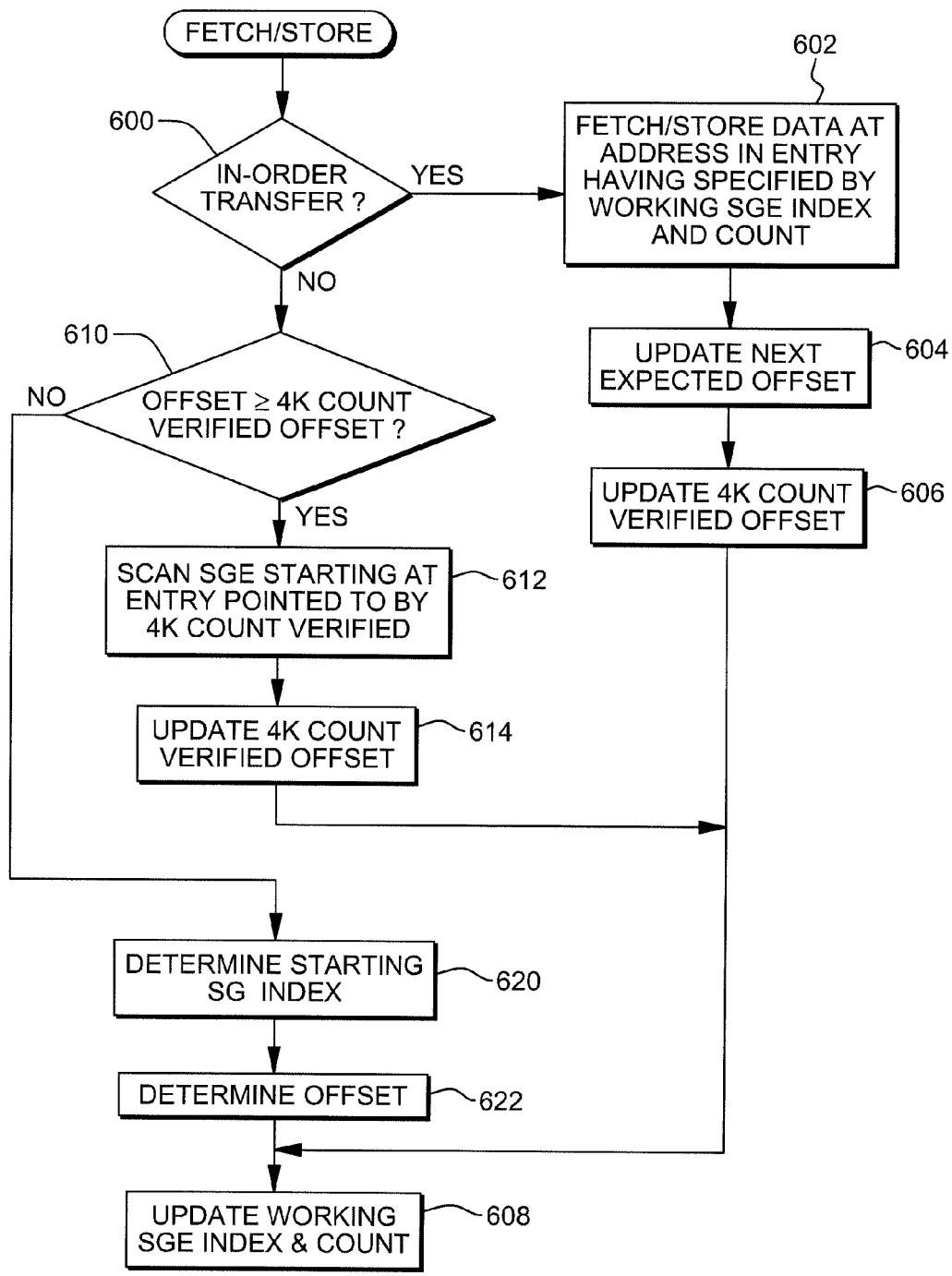
FIG. 6 depicts further details of one embodiment of the logic to scan the address data structure to locate an address to be used in a requested data transfer, in accordance with an aspect of the present invention.

Further details regarding the processing associated with transferring data, including transferring data out-of-order, are described with reference to FIG. 6. Initially, subsequent to receiving a fetch or store request from the link, such as the PCIe link, a determination is made as to whether the transfer is in-order, INQUIRY 600. That is, a determination is made as to whether the offset specified in the request matches the next expected offset. If it does, then the transfer occurred in-order and contiguous with respect to the one immediately preceding. Thus, the hardware fetches or stores the data starting at the system address in the entry specified by the working scatter gather entry index and count, STEP 602. At the completion of the request, the next expected offset is updated to point to the next sequential byte of data for the next request, STEP 604. As long as the transfers on the link occur in-order, it does not matter if the scatter gather entry counts are random or not.

As the hardware is processing entries in the scatter gather list, when the entry is complete and the count in the entry is exactly 4096 (in one example), the 4K count verified offset is advanced by, for instance, 16, STEP 606. Thus, the 4K count verified offset represents the value below which all corresponding scatter gather entries have been verified to have counts of, for instance, 4096. If a scatter gather is encountered whose count is not 4096, the 4K count verified offset is frozen.

Additionally, hardware updates the working scatter gather entry index and the working scatter gather entry count corresponding to the next sequential byte of data, STEP 608. These two values specify the scatter gather entry index and byte position within the scatter gather entry which corresponds to the next sequential offset.

Returning to INQUIRY 600, if the transfer is an out-of-order transfer, then a determination is made as to whether the received offset is greater than or equal to the 4K count verified offset, INQUIRY 610. If an out-of-order offset value is received in the request, which is larger than or equal to the 4K count verified offset, the hardware scans each scatter gather entry starting at the one pointed to by the 4K count verified offset, summing the counts to locate the scatter gather entry which contains the received offset, STEP 612. During this scan, the 4K count verified offset, if not already frozen, is advanced for each scatter gather entry scanned whose count is 4096, STEP 614. The data for the request is fetched or stored at the proper address, and the next expected offset, the working scatter gather entry index and the working scatter gather entry count are updated to point to the next contiguous byte of the new transfer, STEP 608.

Returning to INQUIRY 610, if an out-of-order offset value is received in a request which is less than the 4K count verified offset, the starting scatter gather index for the transfer can be determined by a right shifting of the received offset by, for instance, 12 (dividing it by 4K), STEP 620. Further, the offset from the start of the scatter gather entry is obtained by masking off all but the lower order 12 bits (as an example), STEP 622.

Hardware updates the working scatter gather entry index and the working scatter gather entry count corresponding to the next sequential byte of data, STEP 608.

In one example, applying these rules to the 51 block out-of-order transfer example described above results in the following:

At the beginning of the transfer, the address control word fields, described above, are zero.

The first frame of the transfer arrives with offset 0x002400. This does not equal the next expected offset, so the 4K verified offset is checked. The received offset is greater than the 4K verified offset, so the list is scanned from the top. A offset 0x002000, the SGE with the count of 0x200 is found, so the 4K verified offset is frozen at 0x0200. The scan continues, and the SGE containing the received offset is found at SGE index 3, count 0x200. The transfer starts at system address 0x00001234 56783200. The remainder of the transfer of the first sequence proceeds in order. At the end of the transfer, the next expected offset is 0x004600, the 4K verified offset is 0x0020, the working SGE index is 6, and the working SGE count is 0x200.

The first frame of the second sequence arrives with offset 0x000000. This value is not the expected value, and is now less than the 4K verified offset, so the beginning SGE index is obtained by a right shift of 12 bits. The starting system address is the address in SGE 0 plus the low order 12 bits of the received offset, or 0x00001234 56787000. At the end of this sequence, the next expected offset is 0x002400, the 4K verified offset is still frozen at 0x0020, the working SGE index is 3, and the working SGE count is 0x200.

The first frame of the last sequence arrives with offset 0x004600, again not the expected value. This is larger than both the 4K verified offset and the next expected offset, so the SG list is scanned from the working SGE index (3) and count. The received offset is discovered at 0x200 bytes into SGE index 6. Thus starting address for the transfer is 0x00001234 5678B200. The transfer proceeds in order from that point to the end.

Described in detail above is an efficient technique for locating an address in a list to be used in a data transfer. The technique facilitates a look-up of the address in situations in which a data transfer request is out-of-order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
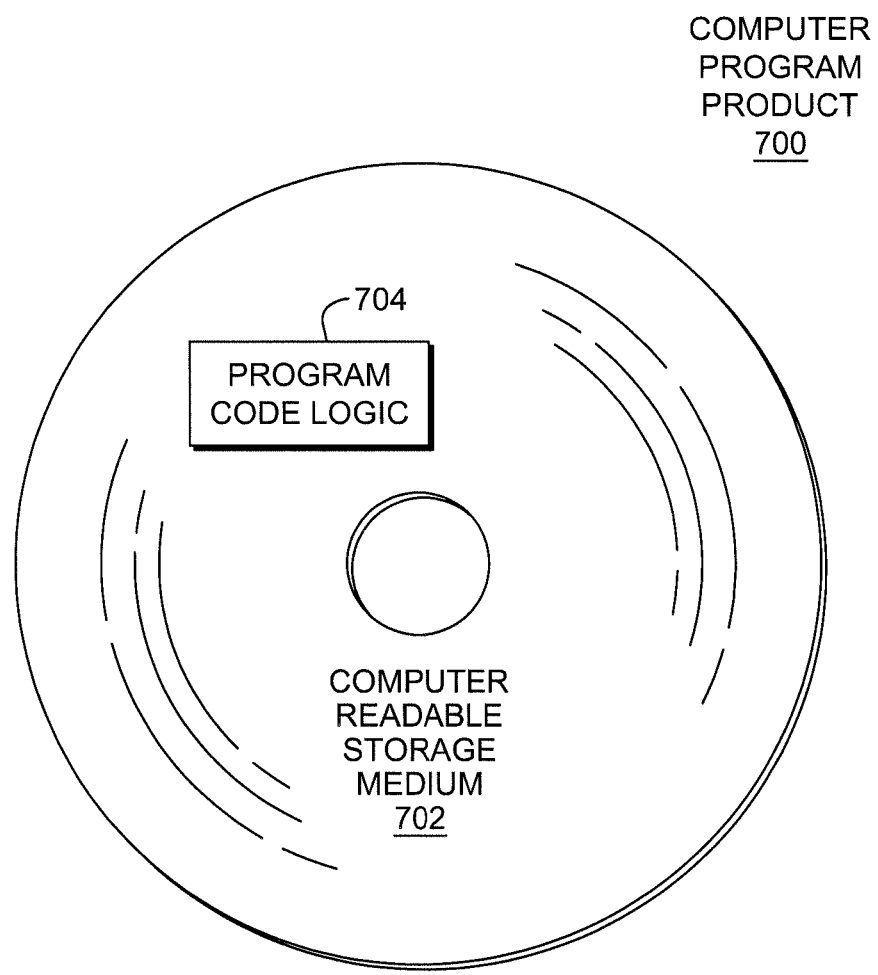
FIG. 7 depicts one embodiment of a computer program product incorporating one or more aspects of the present invention.

Referring now to FIG. 7, in one example, a computer program product 700 includes, for instance, one or more non-transitory computer readable storage media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than System z or z196 servers can include, use and/or benefit from one or more aspects of the present invention. Further, other types of adapters and/or links can benefit from one or more aspects of the present invention. Moreover, more, less and/or different rules may be used to facilitate the address look-up. Many variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of facilitating transfers of data in a computing environment, said method comprising:
    determining, by at least a portion of a hardware component, whether data to be transferred is out-of-order;
    based on the data being out-of-order, comparing by at least a portion of a hardware component a received offset of the data with a first offset, wherein the first offset is a verified offset and wherein the verified offset comprises at least a portion of an offset corresponding to a first entry in an address data structure which has not been verified as having a specified count;
    based on the received offset being one value with respect to the first offset, scanning by at least a portion of a hardware component the address data structure starting at the first offset or a second offset to locate an entry in the address data structure having the received offset and obtaining from the entry an address to be used to transfer the data, wherein the second offset is a next expected offset;
    based on the received offset being another value with respect to the first offset, determining by at least a portion of a hardware component at least one of an index and a count to be used to locate an entry in the address data structure, and obtaining from the entry the address to be used to transfer the data; and
    transferring the data by using at least a portion of a hardware component and employing the address obtained from the entry.

2. The method of claim 1, wherein the one value is greater than or equal to and the another value is less than.

3. The method of claim 1, wherein the specified count is 4096, and wherein the verified offset is frozen based on encountering the first entry in the address data structure is not equal to the specified count.

4. The method of claim 1, wherein based on the received offset being one value with respect to the first offset, scanning the address data structure starting at the first offset, based on the received offset being less than or equal to the second offset.

5. The method of claim 1, wherein based on the received offset being one value with respect to the first offset, scanning the address data structure starting at the second offset, based on the received offset being greater than the second offset.

6. The method of claim 1, wherein determining the index comprises shifting the received offset in a select direction by a predefined number of bits.

7. The method of claim 6, wherein the select direction is to the right and the predefined number of bits is 12.

8. The method of claim 1, wherein determining the count comprises selecting a set number of bits of the received offset as the count.

9. The method of claim 1, further comprising based on the data being in-order, using at least one of a working count and a working index to locate an entry in the address data structure, and obtaining from the entry the address to be used to transfer the data.

10. The method of claim 1, wherein the determining whether the data is out-of-order comprises comparing the received offset to the next expected offset, wherein inequality indicates an out-of-order data transfer.

11. The method of claim 1, further comprising:
    updating one or more controls, based on transferring the data.

12. The method of claim 1, wherein the received offset is a relative offset, relative to a beginning of a block of data to be transferred.

13. A method of facilitating transfers of data in a computing environment, said method comprising:
    determining, by at least a portion of a hardware component, whether data to be transferred is out-of-order;
    based on the data being out-of-order, comparing by at least a portion of a hardware component a received offset of the data with a first offset;
    based on the received offset being one value with respect to the first offset, scanning by at least a portion of a hardware component an address data structure starting at the first offset or a second offset to locate an entry in the address data structure having the received offset and obtaining from the entry an address to be used to transfer the data; and
    based on the received offset being another value with respect to the first offset, determining by at least a portion of a hardware component at least one of an index and a count to be used to locate an entry in the address data structure, and obtaining from the entry the address to be used to transfer the data, wherein the determining the index comprises shifting the received offset in a select direction by a predefined number of bits.

14. The method of claim 13, wherein the select direction is to the right and the predefined number of bits is 12.

15. The method of claim 13, wherein the first offset is a verified offset and the second offset is a next expected offset, wherein the verified offset comprises at least a portion of an offset corresponding to a first entry in the address data structure which has not been verified as having a specified count, and wherein the verified offset is frozen based on encountering the first entry in the address data structure is not equal to the specified count.

16. The method of claim 13, wherein the determining the count comprises selecting a set number of bits of the received offset as the count, and wherein the determining whether the data is out-of-order comprises comparing the received offset to the next expected offset, wherein inequality indicates an out-of-order data transfer.

17. A method of facilitating transfers of data in a computing environment, said method comprising:

determining, by at least a portion of a hardware component, whether data to be transferred is out-of-order;

based on the data being out-of-order, comparing by at least a portion of a hardware component a received offset of the data with a first offset;

based on the received offset being one value with respect to the first offset, scanning by at least a portion of a hardware component an address data structure starting at the first offset or a second offset to locate an entry in the address data structure having the received offset and obtaining from the entry an address to be used to transfer the data, wherein the scanning the address data structure comprises one of: scanning the address data structure starting at the first offset based on the received offset being less than or equal to the second offset, or scanning the address data structure at the second offset based on the received offset being greater than the second offset; and based on the received offset being another value with respect to the first offset, determining by at least a portion of a hardware component at least one of an index and a count to be used to locate an entry in the address data structure, and obtaining from the entry the address to be used to transfer the data.

18. The method of claim 17, wherein the first offset is a verified offset and the second offset is a next expected offset, wherein the verified offset comprises at least a portion of an offset corresponding to a first entry in the address data structure which has not been verified as having a specified count.

19. The method of claim 18, wherein the specified count is 4096, and wherein the verified offset is frozen based on encountering the first entry in the address data structure is not equal to the specified count.

20. The method of claim 17, wherein the determining the count comprises selecting a set number of bits of the received offset as the count, wherein determining the index comprises shifting the received offset in a select direction by a predefined number of bits, and wherein the determining whether the data is out-of-order comprises comparing the received offset to the next expected offset, wherein inequality indicates an out-of-order data transfer.

* * * * *